United States Patent
Dooley et al.

(10) Patent No.: US 7,986,268 B2
(45) Date of Patent: Jul. 26, 2011

(54) GPS RF FRONT END AND RELATED METHOD OF PROVIDING A POSITION FIX, STORAGE MEDIUM AND APPARATUS FOR THE SAME

(75) Inventors: Saul R. Dooley, Reigate (GB); Christopher B Marshall, Haywards Heath (GB); Bryan D. Young, Haywards Heath (GB); Andrew T. Yule, East Grinstead (GB)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 12/299,938

(22) PCT Filed: May 2, 2007

(86) PCT No.: PCT/IB2007/051641
§ 371 (c)(1),
(2), (4) Date: Nov. 7, 2008

(87) PCT Pub. No.: WO2007/129263
PCT Pub. Date: Nov. 15, 2007

(65) Prior Publication Data
US 2009/0179794 A1 Jul. 16, 2009

(30) Foreign Application Priority Data
May 8, 2006 (EP) .................................. 06113638

(51) Int. Cl.
*G01S 19/09* (2010.01)
*G01S 19/36* (2010.01)

(52) U.S. Cl. .............................. 342/357.46; 342/357.76
(58) Field of Classification Search ............... 342/357.3, 342/357.46, 357.51, 357.76; 701/207, 213
See application file for complete search history.

(56) References Cited

U.S. PATENT DOCUMENTS

| | | | |
|---|---|---|---|
| 5,268,927 A | 12/1993 | Dimos et al. | |
| 5,872,540 A | 2/1999 | Casabona et al. | |
| 5,956,376 A | 9/1999 | Nakaya et al. | |
| 6,385,262 B1 | 5/2002 | Gustafsson et al. | |
| 2002/0193090 A1 | 12/2002 | Sugar et al. | |
| 2003/0063219 A1 | 4/2003 | Bellers | |
| 2004/0003408 A1 | 1/2004 | Yu et al. | |
| 2005/0140545 A1 | 6/2005 | Subbarao et al. | |
| 2006/0052076 A1 | 3/2006 | Rumsy | |
| 2006/0068853 A1 | 3/2006 | Dejanovic et al. | |

FOREIGN PATENT DOCUMENTS
WO   2005015255 A1   2/2005

OTHER PUBLICATIONS

Akos, et al; "Real-Time Software Radio Architectures for GPS Receivers", GPS World, Jul. 2001.
GPS Principles and Applications (Editor, Kaplan); ISBN 0-89006-793-7; Artech House, 1996.

*Primary Examiner* — Dao L Phan

(57) ABSTRACT

A GPS RF front-end is disclosed comprising an antenna for receiving GPS signals, an analog to digital converter for sampling received GPS signals and interface circuitry for outputting the GPS signal samples. The GPS RF front-end is configured to vary the sample resolution of GPS signal samples outputted. Also disclosed is a corresponding method of providing a position fix, storage medium and apparatus for the same.

7 Claims, 1 Drawing Sheet

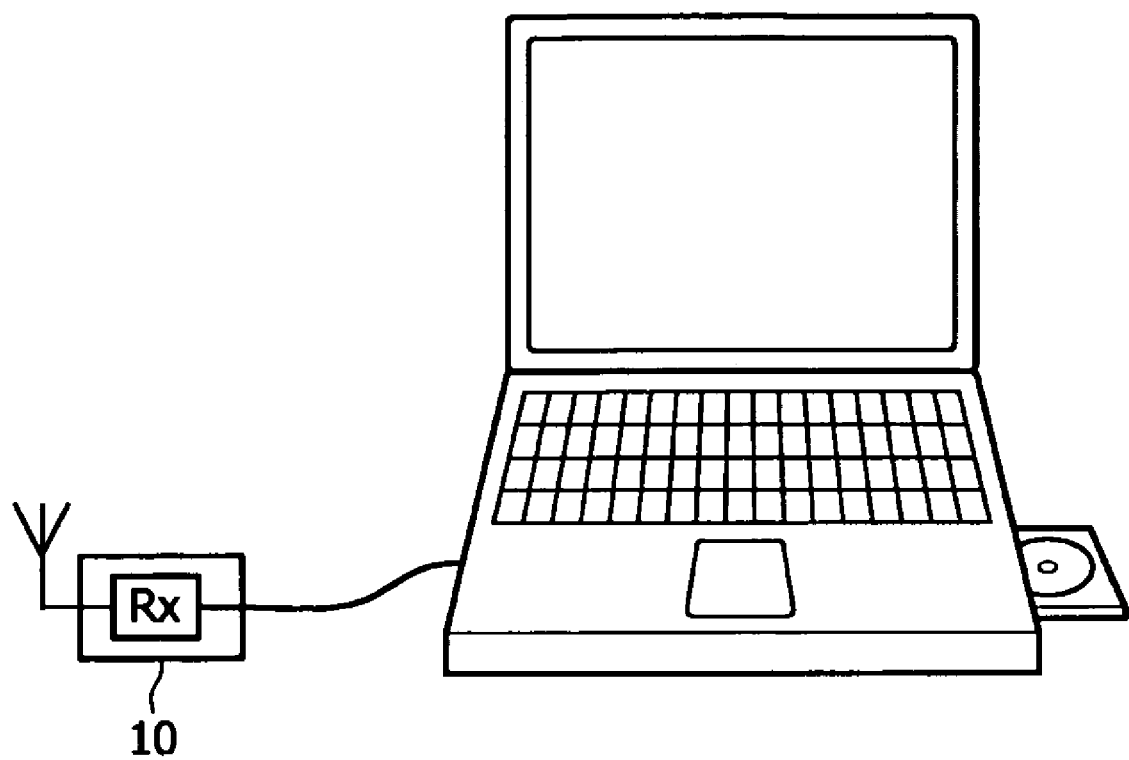

GPS RF FRONT END AND RELATED METHOD OF PROVIDING A POSITION FIX, STORAGE MEDIUM AND APPARATUS FOR THE SAME

The present invention relates to a GPS RF front-end comprising an antenna for receiving GPS signals, an analog to digital converter for sampling received GPS signals and interface circuitry for outputting the GPS signal samples; and related method of providing a position fix and storage medium and apparatus for the same.

Article "Real-time software radio architectures for GPS receivers" by Akos et al. (GPS World, July 2001) discloses "software GPS" in which much GPS signal processing is accomplished by means of a programmable micro-processor or digital signal processor as opposed to analogue or discrete hardwires components. As illustrated in FIG. 2 of this article, a simplified GPS receiver is provided consisting of a GPS antenna and GPS RF front-end for GPS signal pre-processing (including filtering, amplification and frequency down-conversion) and analogue to digital conversion. GPS signal samples outputted from the GPS receiver are then fed in to a modern PC or laptop running appropriate GPS signal processing software for processing the GPS signals to determine a position fix. The authors of this article have contemplated the GPS receiver to be a "plug-in" module, i.e. a "dongle" type device, which because of its simple architecture could be manufactured cheaply, thereby facilitating widespread adoption. And, of course, the GPS signal processing software which resides on the PC is inherently cheap to replicate.

For all GPS receivers, the GPS signal sample rate from the GPS RF front-end is a factor that affects performance and there is a natural tendency to want a high sample rate to accurately characterise the received GPS signals in the digital domain. However, the higher the sample rate, the more processing resources are consumed and this is particularly important for software GPS architectures as it has a direct impact on memory and CPU usage, and hence impacts on battery life in portable devices.

In accordance with the present invention, there is provided an GPS RF front-end of the type described above characterised by being configured to vary the sample resolution of GPS signal samples outputted, especially in accordance with an instruction received from outside the GPS RF front-end.

Also provided in accordance with the present invention is a method of providing a position fix comprising the steps of: receiving at least two sets of GPS signal samples having different sample resolutions outputted from a GPS RF front-end and processing those GPS signal samples to determine a position fix; and a computer program, computer-readable storage medium and apparatus for the same.

Such a method may further comprise the step of issuing an instruction to the GPS RF front-end to vary the sample resolution of GPS signal samples outputted and where this is the case, the instruction is ideally made based on a mode of processing of the GPS signal samples (e.g. such as signal acquisition or signal tracking).

The inventors have realised that high samplings rates required to accurately characterise received GPS signals in the digital domain are not always required to process the GPS signals and that some modes of processing do not require such a high sampling rate. Accordingly, by switching to a lower rate, the memory and CPU usage can be minimised and battery life extended in portable devices.

The present invention will now be described, by way of example only, with reference to the accompanying FIGURE which shows, schematically, a laptop PC connected to a GPS receiver, both operating in accordance with the present invention.

Referring to the accompanying FIGURE, the laptop PC is connected via a USB PC port and corresponding cable to the GPS receiver 10 which consists of a GPS RF front-end Rx and a GPS antenna. Whilst the GPS receiver could have been a "dongle" type device thereby omitting the cable, the cable facilitates positioning of the GPS receiver (including the antenna) in a prominent position, thereby increasing the chances of acquiring GPS signals. For example, one might place the GPS receiver near a window if operating in doors.

When operative, the GPS receiver receives NAVSTAR SPS GPS signals through its antenna and pre-processes them, typically by passive bandpass filtering in order to minimise out-of-band RF interference, preamplification, down conversion to an intermediate frequency (IF) and analogue to digital conversion. The resultant GPS signal samples contain the IF signal which remains modulated, still containing all the information from the available satellites.

The GPS signal samples are outputted from the GPS receiver via the USB link into PC memory (not shown). Using laptop PC based GPS signal processing software, the GPS signal samples are then processed so that GPS signals are acquired for the purpose of deriving pseudorange information from which the position of the PC can be determined using conventional navigation algorithms. Such GPS signal acquisition and pseudorange processing is well known, for example, see GPS Principles and Applications (Editor, Kaplan) ISBN 0-89006-793-7 Artech House, 1996.

In accordance with the present invention, the GPS RF front-end is configured to vary the sample resolution of GPS signal samples outputted.

For example, from a "cold start" where the received frequency and code phase of received GPS signals is unknown, acquiring GPS signals involves searching for GPS chipping codes in a wide frequency/code phase window which requires a lot of computation. As the amount of computation is directly proportional to the sample rate, during a cold start, a relatively low sample rate is utilised to acquire the GPS signals as efficiently as possible.

Subsequently, when the GPS signals have been acquired and are being tracked, the sample rate can be increased to more accurately characterise received GPS signals in the digital domain. This enables pseudoranges to be measured with greater accuracy and hence more accurate positioning.

Ideally, the GPS RF front-end is receptive to instructions from the software GPS processing engine to vary its sample rate. When varying the sample rate, matching adjustments may have to, be made in the GPS RF front-end signal processing. For example, the IF frequency may be changed and filtering responses may be changed to optimise the GPS outputs.

For any given sample rate, optimal GPS RF front-end signal processing would be a matter of rudimentary design. It may be as simple as having a single line/pin that when driven high changes the value of a divider/multiplier inside the front-end that in turn drives the A/D converter. Alternatively, one might have several almost complete front-ends housed together, each of which operates with a different frequency plan and only one of which is used at any time. In practice some intermediate implementation is probably likely, with programmable frequency dividers/multipliers and filter blocks.

Whilst the present invention has been illustrated in the context of a laptop PC, it is of course equally applicable to other apparatus able to support GPS signal processing software and to which a GPS receiver according to the present invention can be connected. For example, the invention may be employed with mobile devices such as PDAs and telephone; or generally stationary objects such as a TVs or TV set-top boxes.

Also, whilst the connection between the GPS receiver and the GPS signal processing software is entirely wired in the above example, it could conceivably involve a wireless link.

Finally, whilst the invention has been described in the context of NAVSTAR GPS, the all weather, spaced based navigation system developed and currently operated by the US Department of Defense, it will be appreciated that the invention is equally applicable to other global positioning systems including GLONASS and Galileo and hybrids thereof.

The invention claimed is:

1. A GPS RF front-end comprising:
   an antenna for receiving GPS signals;
   an analog to digital converter for sampling received GPS signals; and
   interface circuitry for outputting the GPS signal samples characterized by the GPS RF front-end being configured to vary the sample resolution of the GPS signal samples outputted;
   wherein the sample resolution of the GPS signal samples outputted is varied in accordance with an instruction received from outside the GPS RF front-end.

2. A GPS RF front-end according to claim 1 wherein the sample resolution of GPS signal samples outputted is varied by discarding some samples initially taken prior to output.

3. A GPS RF front-end according to claim 1 further comprising analogue signal processing means for filtering and down-converting the received GPS signals to an intermediate frequency for sampling; and wherein the filtering and/or down-converting is varied with varying of the sample resolution.

4. A method of providing a position fix comprising the steps of:
   receiving at least two sets of GPS signal samples having different sample resolutions outputted from a GPS RF front-end;
   processing those GPS signal samples to determine a position fix;
   issuing an instruction to the GPS RF front-end to vary the sample resolution of GPS signal samples outputted.

5. A method according to claim 4 wherein the instruction to the GPS RF front-end to vary the sample resolution of GPS signal samples is made based on a mode of processing of the GPS signal samples.

6. A method according to claim 5 wherein the mode of processing of the GPS signal samples is one of either signal acquisition or signal tracking.

7. A system comprising:
   a processor;
   a memory for storing instructions, which when executed by the processor perform the steps of:
   receiving at least two sets of GPS signal samples having different sample resolutions outputted from a GPS RF front-end;
   processing those GPS signal samples to determine a position fix; and
   issuing an instruction to the GPS RF front-end to vary the sample resolution of GPS signal samples outputted.

* * * * *